Aug. 28, 1928.

O. HENZE 1,682,376

COMBINATION INDICATING AND ADJUSTING DEVICE FOR RADIOCIRCUITS

Filed April 26, 1927

INVENTOR.
OTTO HENZE.
BY
ATTORNEY.

Patented Aug. 28, 1928.

1,682,376

UNITED STATES PATENT OFFICE.

OTTO HENZE, OF BROOKLYN, NEW YORK.

COMBINATION INDICATING AND ADJUSTING DEVICE FOR RADIOCIRCUITS.

Application filed April 26, 1927. Serial No. 186,643.

This invention relates to indicating and adjusting devices and more particularly to such as are used in radio circuits.

Heretofore, the adjusting of such apparatus was accomplished ordinarily by a dial fastened on the adjusting spindle of the adjustable instrument, there being a pointer disposed on the panel above the dial so as to indicate the position of the movable adjusting elements relative to those of a stationary nature.

However, such devices were inaccurate, due mainly to the backlash of the dial on the shaft when rotating in an opposite direction.

Another fault of such devices was the requirement of readjustment, which is a source of annoyance and trouble.

With the advancement of modern radio circuits quick tuning or adjusting has been practically abandoned and experience proved the necessity for creating a slow actuated, positive and accurate adjusting device.

Then, too, pointer and index of the known adjusting dials do not alow a fine and true reading, unless the operator is capable of imagining a finer graduation of the dial, this being particularly true if the circuit was of a highly sensitive and selective type.

It is therefore the main object of this invention to discard adjusting dials having pointers, graduation lines or the like and to introduce the employment of a revolution-counter as indicating mechanism and to provide means whereby the adjusting of radio circuits is simplified and accomplished in an accurate manner and whereby any actuated adjustments are indicted by changing a visible combination of numerals from 0 to 9 inclusive, thereby enabling everybody to read off numerals instead of counting imaginary graduation lines or so, and eliminating the trouble described in the foregoing paragraphs.

This and other advantages which will become apparent as the specification progresses, are attained by the novel construction, combination and arrangement of elements, hereinafter described and illustrated in the accompanying illustration, forming an important component of this disclosure, and in which:—

Figure 1:
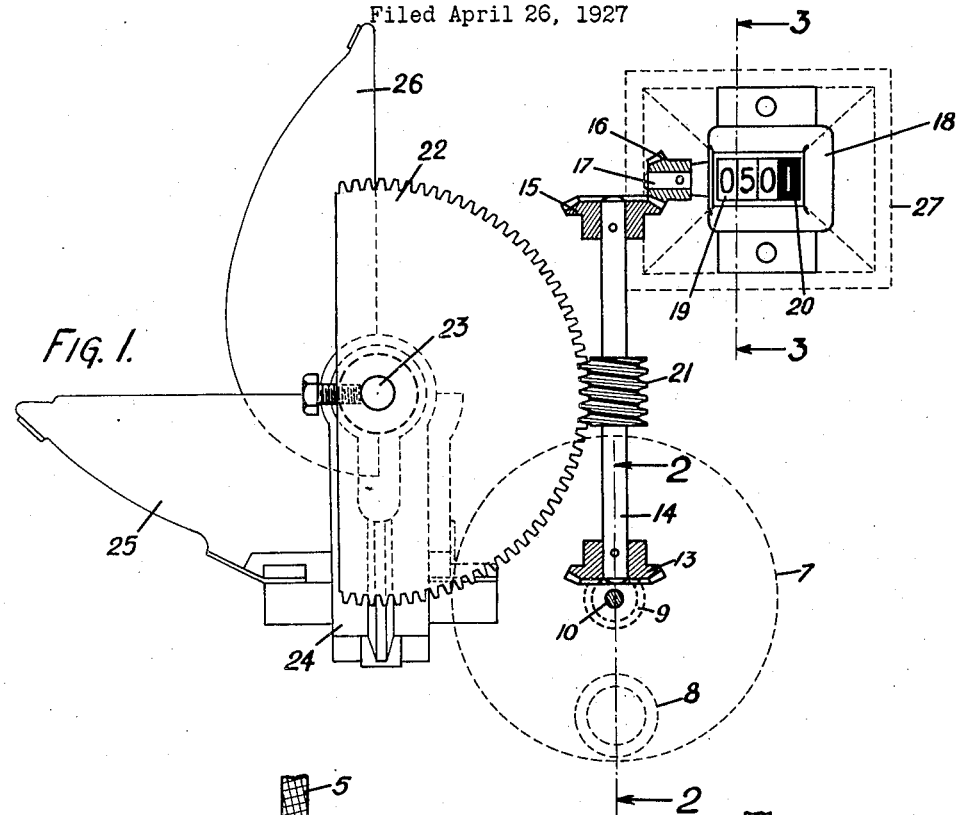
Figure 1 is a partial front elevational, partial sectional view, showing an embodiment of this invention as applied to radio tuning apparatus, the panel and the bearing bracket being removed to show the inner construction.
Figure 2:
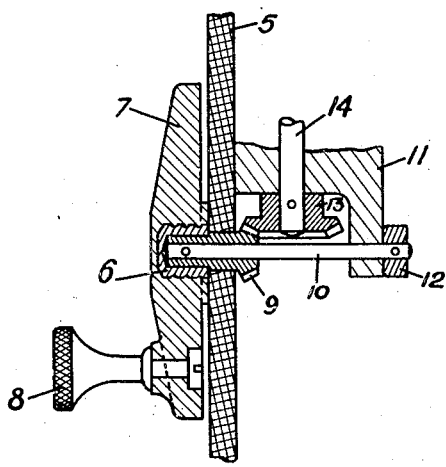
Figure 2 is a fragmentary, vertical sectional view taken on line 2—2 of Figure 1.
Figure 3:
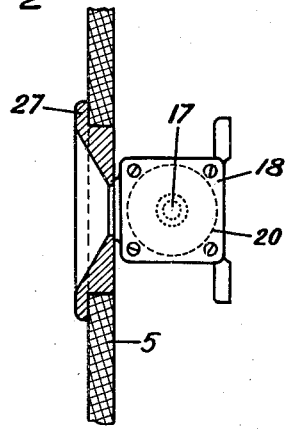
Figure 3 is a like view taken on line 3—3 of Figure 1.

In the drawing, the numeral 5 generally designates a panel of non-conducting material as is used in cabinets for radio apparatus and the like.

Rotatably mounted on the panel 5 is a sleeve 6 carrying a disc 7 provided with a handle or turning knob 8.

Fixed in the sleeve 6 is the hub of a bevel pinion 9 through which extends a pressed on shaft 10, its outer end reaching through a bearing of bracket 11 to receive a pinned collar 12.

The pinion 9 is in mesh with a mating gear 13 fixed on a shaft 14 supported in bearings of bracket 11 and having at its outer end a fixed bevel gear 15 meshing with a corresponding pinion 16 fixed on a spindle 17 of a revolution-counter 18, in which are a series of revoluble number wheels 19 and 20, the latter being at the outer end and of a contrasting color, as shown.

In the shown counting mechanism 18 is the spindle 17 revolubly mounted in the counter-cage and fastened to the driving wheel 20. The wheels 19 are inter-related to wheel 20 and each other in the manner of a counting register.

All the wheels 19 and 20 show on their peripheries 10 numerals from 0 to 9 inclusive, visible through a slot of the counter-cage and slotted eye-piece 27. The slot being of such dimensions as to make only one numeral of each number wheel visible at the time.

The timing relation of the number wheels 19 and 20 to the slot and the position of the enclosed coupler gears is such as to transmit a tenth revolution to the next number stage when the driving number wheel changes the visible numeral 9 to 0, or 0 to 9, adding or subtracting according to the turning direction of the driving spindle 17.

Also fixed on the shaft 14 is a worm 21 engaging the teeth of a segmental gear 22 secured on the adjusting spindle 23 revolubly mounted on the bearing frame 24 of a variable condenser which is fastened to the bearing bracket 11.

Interposed between the fixed stator plates 25 of the variable condenser are a series of rotor plates 26, all secured on the adjusting spindle 23; thus it will be seen that upon actuation of the operating disc 7, movement will be transmitted to the rotor plates 26 and the adjusted capacity amount of the variable condenser is indicated by a reference number on the number wheels 19 and 20 of the revolution-counter 18 visible through an eye-piece 27 set in the panel 5.

Having thus described my invention what I claim as new and desire to secure by Letters Patent, is:—

1. The combination with a tuning device for radio apparatus, of a segmental gear on the adjusting shaft of said tuning device, a drive shaft, means to rotate said drive shaft, a worm on said drive shaft meshing with said segmental gear, a gear on said drive shaft, and means actuated by said gear to indicate the adjusting wave-length of the tuning device.

2. The combination with a tuning device for radio apparatus, of a segmental gear on the adjusting shaft of said tuning device, a pair of shafts, meshing gears on said shafts, means to manually actuate one of said shafts, a worm on the other of said shafts engaging said segmental gear, a third gear on the last named shaft, and a registering mechanism operated by said third named gear to indicate the wave-length to which the tuning device is adjusted.

3. The combination with a tuning device for radio apparatus including a bearing bracket or frame on which a variable condenser can be mounted, of a segmental gear connecting the adjusting shaft of said condenser, means located in said bracket to operate said gear and said adjusting shaft, a revolution-counter attached to said bracket and engaged with said gear operating means, whereby a reference number to the adjusted capacity amount of said variable condenser will be indicated by changing a combination of numerals visible through a slotted eye-piece.

4. The combination with an adjusting device for radio circuits including a bracket or bearing frame on which the adjustable instrument can be mounted, of a gear driving the adjusting shaft of said adjustable instrument, means to operate said gear, a registering mechanism and means connecting said gear operating means and said registering mechanism, thereby indicating a reference number to the wave-length or frequency; or the wave-length or the frequency itself by changing a visible combination of numerals.

5. The combination with an adjustable instrument for radio circuits including a bearing bracket or frame, of a revolution-counter as combination-indicator, operating means to manually actuate the adjustment of said adjustable radio instrument and drive connections between said operating means and said revolution-counter, whereby whole or fractional revolutions of said driving connections are indicated by a visible number combination on the said counter.

6. In an indicating mechanism for adjustable radio instruments the combination of a cage or bearing frame, means to attach said cage or frame to the adjustable instrument and panel, a drive shaft located in said frame or cage fastened to a driving wheel, several other geared wheels rotating on said drive shaft but interrelated to the driving wheel and each other in the manner of a counting register, of numerals from 0 to 9 inclusive marked on the peripheries of said wheels, of a slot in said cage or bearing frame to make only one numeral of each wheel visible at the time, a slotted eye-piece to frame said slot, whereby a number combination for each adjustment of said drive shaft is indicated through the slot.

In witness whereof I have affixed my signature.

OTTO HENZE.